United States Patent [19]

Hockman

[11] Patent Number: 5,088,359
[45] Date of Patent: Feb. 18, 1992

[54] FASTENER NOSE PIECE FEEDER

[75] Inventor: Edward N. Hockman, Auburn Hills, Mich.

[73] Assignee: Clyde Corporation, Rochester Hills, Mich.

[21] Appl. No.: 550,663

[22] Filed: Jul. 10, 1990

[51] Int. Cl.⁵ .............................................. B25B 23/10
[52] U.S. Cl. .................................... 81/57.37; 81/433; 81/454; 81/456
[58] Field of Search ....................... 81/57.37, 430–435, 81/451–458

[56] References Cited

U.S. PATENT DOCUMENTS 4,462,283  7/1984  Ito ...................................... 81/57.37

Primary Examiner—D. S. Meislin
Attorney, Agent, or Firm—Barnes, Kisselle, Raisch, Choate, Whittemore & Hulbert

[57] ABSTRACT

A nose piece feeder for a power driver in which articles are guided from a feed passage into a discharge passage by a pair of jaws which are movable from a guide position to a driver access position. When the driver is activated to expel an article from the discharge passage, the jaws are moved to the driver access position permitting the driver to pass between them.

4 Claims, 2 Drawing Sheets

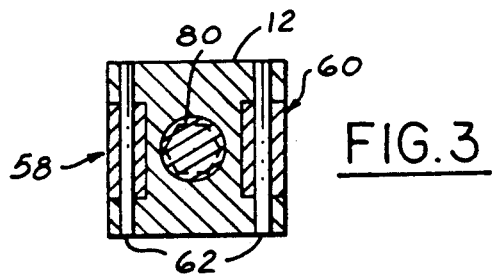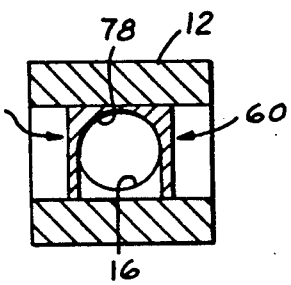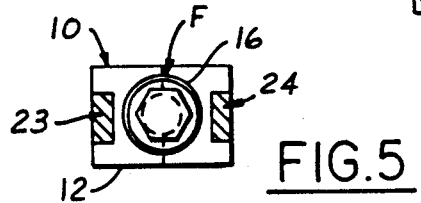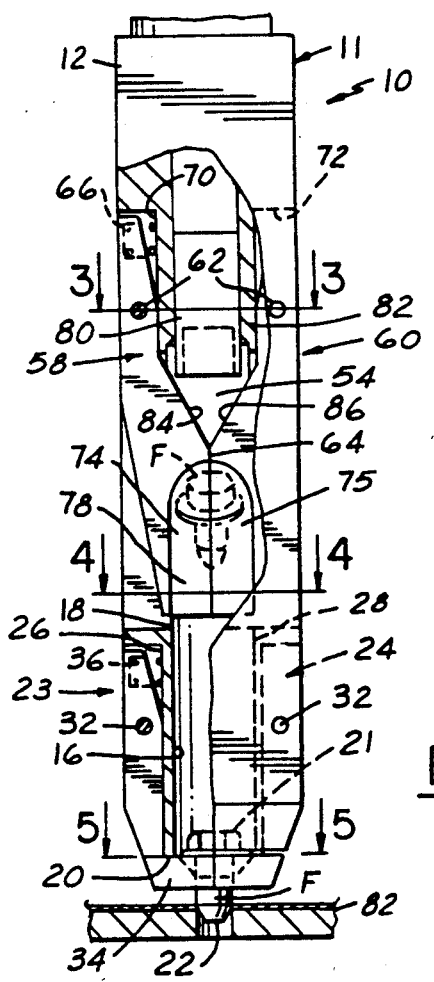

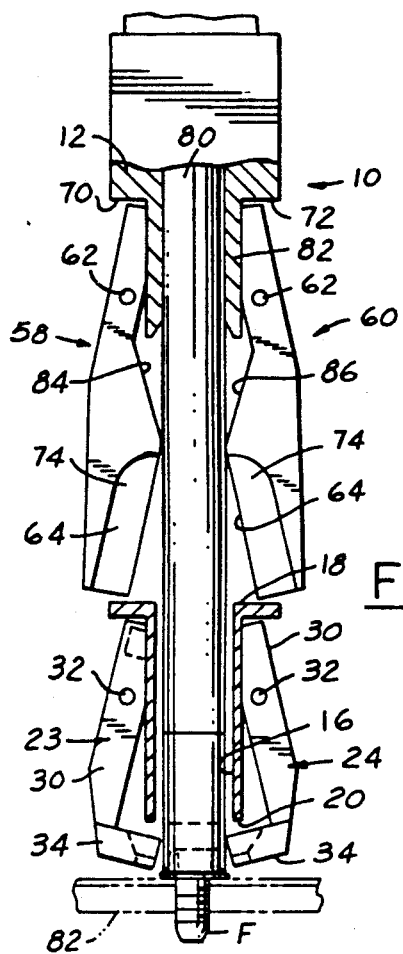
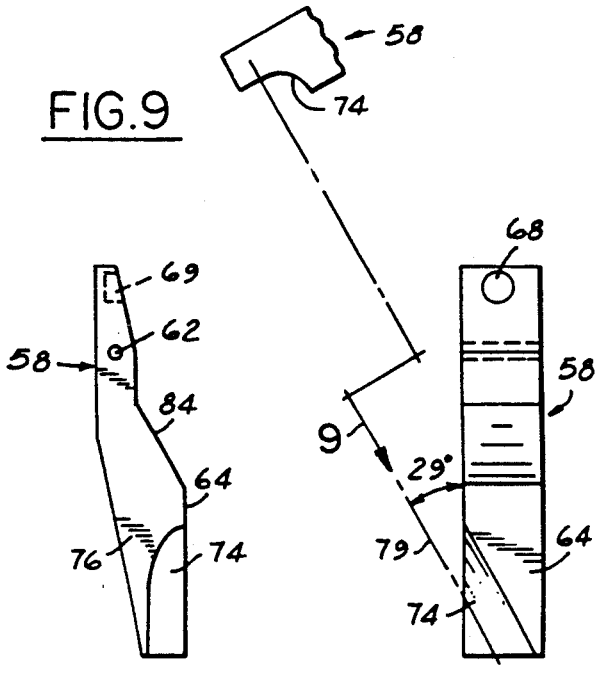
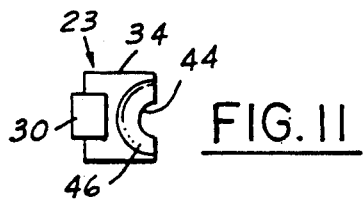
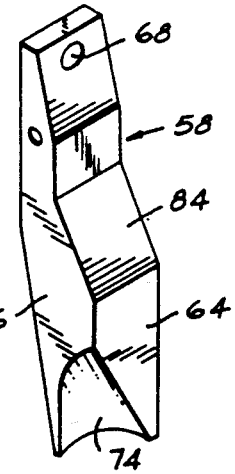
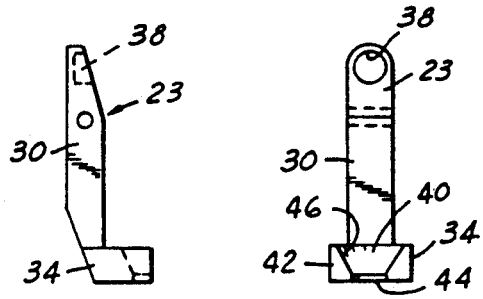
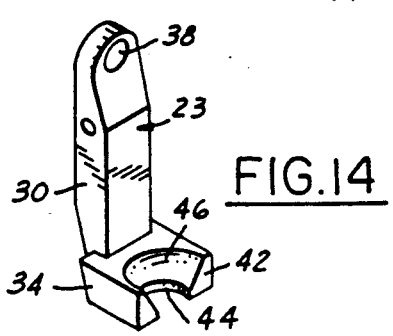

FASTENER NOSE PIECE FEEDER

FIELD

This invention relates generally to article feeding apparatus and more particularly to apparatus for feeding headed articles one at a time to a power tool, for example.

BACKGROUND

In conventional feeding apparatus for headed articles, the articles are fed rapidly to a power driver, one at a time with their axes aligned with the direction of feed. The articles are supplied from a hopper through a feed passage into the inlet of a generally vertical discharge passage. Since the feed passage extends downwardly at an angle to the discharge passage, the articles have a tendency to cock and become jammed, particularly at the point where they enter the inlet of the discharge passage.

SUMMARY

In accordance with this invention, a nose piece feeder for a power driver is provided in which articles are guided from a feed passage into a discharge passage by a pair of jaws movable from a guide position to a driver access position.

Objects, features and advantages of this invention are to provide a nose piece feeder which can feed articles rapidly without cocking or jamming, can feed relatively short articles, can feed top heavy articles, and which is reliable, rugged, durable, of simplified design and economical to manufacture and assemble.

BRIEF DESCRIPTION OF THE DRAWINGS

These and other objects, features and advantages of the invention will become apparent from the following description, especially when considered with the accompanying drawings in which:

FIG. 1 is a side view of a nose piece assembly of a power driver constructed in accordance with this invention.

FIG. 2 is a view partly in elevation and partly in section taken on the line 2—2 in FIG. 1, showing the driver in retracted position.

FIG. 3 is a sectional view taken on the line 3—3 in FIG. 2.

FIG. 4 is a sectional view taken on the line 4—4 in FIG. 2.

FIG. 5 is a sectional view taken on the line 5—5 in FIG. 2.

FIG. 6 is a view similar to FIG. 2, but showing the driver after it has expelled a fastener from the lower end of the discharge passage.

FIG. 7 is a side view of one of the fastener guide jaws.

FIG. 8 is a view of the guide jaw as seen from the right in FIG. 7.

FIG. 9 is a fragmentary view in elevation looking in the direction of the arrow 9 in FIG. 8.

FIG. 10 is a respective view of the guide jaw shown in FIGS. 7-9.

FIG. 11 is a top view of one of the lower fastener retainer jaws.

FIG. 12 is a side view of the lower retainer jaw shown in FIG. 11.

FIG. 13 is a view of the lower retainer jaw as seen from the right in FIG. 12.

FIG. 14 is a perspective view of the lower retainer jaw of FIGS. 11-13.

DETAILED DESCRIPTION

Referring now more particularly to the drawings and especially to FIGS. 1, 2 and 6, there is illustrated a nose piece assembly 10 of a power driver such as a pneumatic power tool. The nose piece assembly has a body 11 with a main body portion 12 and a tubular branch portion 14 which connects into the main body portion 12 at a point between the upper and lower ends of the main body portion at an acute included angle to the vertical, preferably at about 29°.

For the introduction and discharge of fasteners F, the main body portion 12 has at the lower end an open ended, vertical discharge passage 16 with an inlet 18 at its upper end and an outlet 20 at its lower end. Fasteners F having heads 21 and shanks 22 are admitted to the discharge passage 16 through inlet 18 with their shanks extending downwardly, and are releasably retained at the outlet 20 by a pair of retention jaws 23 and 24.

Retention jaws 23 and 24 are mounted in recesses 26 and 28 in the main body portion 12 on opposite sides of the discharge passage 16. Each jaw has a generally vertical bar 30 mounted for pivotal movement on a horizontal pivot pin 32. Each jaw has a fastener retainer 34 at the lower end of the bar 30.

Jaws 23 and 24 are capable of pivotal movement from an operative, fastener retaining position shown in FIG. 2 to a retracted, release position shown in FIG. 6. The jaws are yieldably urged to the operative position of FIG. 2 by any suitable means, for example by coil springs 36 compressed between the bottoms of sockets 38 near the upper ends of bars 30 and the bottoms of the recesses 26, 28. In the operative position of jaws 23, 24, preferably the lower end portions of bars 30 may abut the bottoms of the recesses 26, 28.

The retainers 34 on the lower ends of the bars 30 cooperate to retain or support a fastener in the operative position of the jaws shown in FIG. 2. Each retainer 34 is in the form of a horizontal plate extending radially inwardly from the bar 30. A recess 40 extends from top to bottom of the retainer and opens through the radially inner face 42 thereof. Recess 40 has a semi-circular portion 44 at the bottom of the retainer, and an upwardly flaring portion 46 of inverted frustoconical form extending through the top of the retainer.

In the operative position of the jaws 23 and 24, the inner faces 40 abut, the semi-circular portions 44 together form a circular opening slightly greater in diameter than the shank of a fastener, and flaring portions 46 together form a frustum of an inverted cone on which the head of a fastener may seat with the shank extending downwardly through the opening as shown in FIG. 2.

The branch portion 14 has a passage 50 of uniform circular cross-section throughout its length. Fasteners F are delivered from a hopper or the like shank first and one at a time through a tube 52 into the upper end of passage 50 by suitable apparatus such as that shown in U.S. Pat. No. 4,363,573. The fasteners move downwardly through passage 50 and into a cavity 54 above discharge passage 16 in the main body portion 12.

The fasteners are guided through the transition from the juncture between the passages in the branch and main body portions 14, 12 by jaws 58 and 60.

Jaws 58 and 60, which are elongated, generally vertical members, are mounted in cavity 54 on laterally spaced apart, parallel, horizontal pivot pins 62. The pivot pins 62 extend parallel to the plane established by the main body 12 and the branch portion 14. The jaws are capable of pivotal movement from the operative position of FIG. 2 to the retracted position of FIG. 6. In the operative position of FIG. 2, the confronting surfaces 64 of the lower portions of the jaws beneath the pivot pins abut one another in flush surface-to-surface contact. In the retracted position, the confronting surfaces 64 move apart as shown in FIG. 6.

The jaws 58 and 60 are yieldably urged to the operative position of FIG. 2 by any suitable means, preferably by coil springs 66 compressed between the bottoms of sockets 68 in the upper portions of the jaws above the pivot pins and the bottoms of recesses 70 and 72 into which the upper portions of the jaws extend.

The jaws 58 and 60 are provided as a means to guide the fasteners from the passage 50 in the branch portion 14 through the cavity 54 and into the discharge passage 16 shank first and without jamming or cocking. Because of widening at the juncture between passage 50 and cavity 54 and the change in direction of fastener movement through the cavity 54 from the passage 50 to the passage 16, in this instance about 29°, cocking and hang-ups are most likely to occur at this point. Cocking and hang-ups are particularly likely to occur with fasteners which are top heavy and/or have a relatively short,, axial length compared to their maximum diameter. A fastener is top heavy if when extending horizontally its center of gravity is closer to its head end than the free end of its shank.

The jaws 58 and 60 are formed with recesses 74 and 75 at the lower end. The recesses extend through the confronting surfaces 62 and also through the front surfaces 76 of the jaws. When the jaws come together in the operative position, which is the fastener guiding position, the walls of these recesses together form an open-ended channel 78 from the passage 50 to the discharge passage 16.

The recesses which form channel 78 are of substantially the same arcuate form as passage 50 throughout most of their extent, but do flatten out somewhat at the ends as shown in FIG. 4. The walls of the channel 78 extend in straight line continuation of the walls of passage 50 and lead to the inlet 18 of the discharge passage 16. The longitudinal centerline of channel 78, indicated at 79, coincides with that of passage 50.

An elongated, power operated driver 80 is mounted in a vertical guide 82 in the upper portion of body 12 for movement between an upper retracted position shown in FIG. 2 and a lower extended position shown in FIG. 6. The driver 80 as it is extended first drivingly engages the head of a fastener F supported by retention jaws 23 and 24, and then while expelling the fastener from the lower end of discharge passage 16 drives it into assembly with a workpiece such as the strip 82.

The jaws 58 and 60 have camming surfaces 84 and 86 which are inclined toward one another in a downward direction and are in the path of downward movement of the driver when the jaws are in the operative position shown in FIG. 2. The driver 80 during its downward movement engages the camming surfaces to move the jaws to the retracted position of FIG. 6.

In use, fasteners F move one at a time through the passage 50, channel 78 and discharge passage 16 to the bottom of the discharge passage where they are caught and releasably retained by the lower jaws 23 and 24. Each fastener travels shank first, that is with the shank extending downwardly throughout its entire movement to the bottom of the discharge passage 16. When retained at the bottom of the discharge passage 16 by the lower jaws 23 and 24, the head of the fastener is supported on the frusto-conical portion 46 of the recess 40 and the shank projects downwardly through the opening formed by the semi-circular portions 44 of the recess. The driver 80 then moves from its retracted position shown in FIGS. 1 and 2 to the extended position of FIG. 6 in which it drivingly engages the head of the fastener and expels it from the lower end of the discharge passage 16 while being rotated to drive the fastener into strip 82. During its downward movement, the driver engages the camming surfaces 84 and 86 of the jaws 58 and 60, camming them apart as in FIG. 6. The lower jaws 23 and 24 are also cammed apart by the head of the fastener as it is expelled. The driver is then retracted to its upper position shown in FIGS. 1 and 2 after which another fastener moves through the nose piece for retention by the lower jaws 23 and 24 and the driver 80 is again extended to expel and drive that fastener.

What is claimed is:

1. A nose piece assembly for feeding fasteners having a head and a shank, comprising a body having an elongated first passage therein, said first passage having an outlet at one end thereof, retainer means adjacent said outlet for releasably retaining a fastener oriented with its shank extending toward the outlet from the head thereof, means providing said first passage with a fastener inlet at a point spaced from said outlet, means providing a second passage opening into said inlet and extending toward said outlet at an acute angle to said first passage to introduce a plurality of such fasteners into said inlet of said first passage one at a time and with the shank extending toward said outlet, means for guiding a fastener into said inlet so that it will enter said first passage without jamming and with its shank leading its head until it reaches said outlet for retention by said retainer means, said guiding means comprising a pair of jaws, means mounting said jaws on said body for pivotal movement from an operative fastener guiding position to a retracted position, means urging said jaws to said operative position thereof, said jaws when in said operative position cooperating with one another to define a fastener guide having recessed wall portions of said jaws forming a channel from said second passage to said first passage, and a driver carried by said body and movable forward in said first passage to expel from said outlet a fastener held by said retainer means, said jaws having camming surfaces in the path of forward movement of said driver when said jaws are in said operative position thereof, and said driver during forward movement toward said outlet engaging said camming surfaces and moving said jaws to said retracted position to permit said driver to pass between them.

2. The nose piece assembly defined in claim 1, wherein said second passage terminates adjacent said inlet in a tubular portion, and said recessed wall portion forming the channel provide a continuation of said tubular portion and extending from said tubular portion to said inlet of said first passage.

3. The nose assembly defined in claim 1, wherein said second passage terminates adjacent said inlet in a tubular portion of uniform circular cross-section, said recessed wall portions are of substantially the same arcuate form as said tubular portion of said passage, and said recessed wall portion forming an open-ended channel extending in generally straight line continuation of said tubular portion from said tubular portion to said inlet of said first passage.

4. The nose piece assembly defined in claim 3, wherein said retainer means comprises lower jaws beneath said first-mentioned jaws on said body, means pivoting said lower jaws for movement from an operative fastener holding position to a retracted fastener releasing position, means yieldably urging said lower jaws to said operative position, and said lower jaws having camming surfaces thereon and being movable to said retracted position thereof by the head of a fastener engaging said camming surfaces as it passes between said lower jaws.

* * * * *